US011042338B2

(12) United States Patent
Yuan et al.

(10) Patent No.: US 11,042,338 B2
(45) Date of Patent: Jun. 22, 2021

(54) FONT PROCESSING DURING PRINTER REDIRECTION IN VIRTUAL DESKTOP ENVIRONMENTS

(71) Applicant: VMware, Inc., Palo Alto, CA (US)

(72) Inventors: Hui Yuan, Beijing (CN); Weigang Huang, Beijing (CN); Hui Zhang, Beijing (CN); Mangui She, Beijing (CN); Kun Shi, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/723,817

(22) Filed: Dec. 20, 2019

(65) Prior Publication Data

US 2021/0141579 A1 May 13, 2021

Related U.S. Application Data

(63) Continuation of application No. PCT/CN2019/116563, filed on Nov. 8, 2019.

(51) Int. Cl.
*G06F 3/12* (2006.01)
*G06F 9/451* (2018.01)

(52) U.S. Cl.
CPC .......... *G06F 3/1261* (2013.01); *G06F 3/1205* (2013.01); *G06F 3/1255* (2013.01); *G06F 9/452* (2018.02); *G06F 3/1288* (2013.01)

(58) Field of Classification Search
None
See application file for complete search history.

(56) References Cited

U.S. PATENT DOCUMENTS 8,149,431 B2 * 4/2012 Barton .................. G06F 3/1289 358/1.13
2008/0201485 A1 * 8/2008 Patwardhan ............ H04L 29/06 709/238
2013/0326348 A1 * 12/2013 Ip .......................... G06F 40/129 715/269
2013/0332591 A1 * 12/2013 Jaudon ............. H04L 29/06326 709/223
2014/0013234 A1 * 1/2014 Beveridge ............ G06F 3/0488 715/740
2014/0257789 A1 * 9/2014 Zaric .................... G06K 9/3208 704/8
2016/0124685 A1 * 5/2016 Mickeleit ............. G06F 3/1204 358/1.15
2017/0344520 A1 * 11/2017 Takahashi ........... G06F 16/9577
2017/0351537 A1 * 12/2017 AbiEzzi .................. G06F 9/452

* cited by examiner

*Primary Examiner* — Henok Shiferaw

(57) ABSTRACT

Techniques are described for enabling printer redirection in virtual desktop environments that provides a font processing system including a session-based font cache subsystem. The system resolves any font mismatching issues that might arise in the context of printing on a virtual desktop from virtual desktop client devices in an optimized manner that reduces latency and generally improves performance during printer redirection. The session-based font cache is used to accelerate the font processing and to reduce the transmitted font data between the virtual desktop agent and the virtual desktop client in the context printer redirection.

17 Claims, 6 Drawing Sheets

Data center 101
Virtual Desktop Agent 103-1
Guest OS 105-1
VM 110-1
Virtual Desktop Agent 103-2
Guest OS 105-2
VM 110-2
Virtual Desktop Agent 103-N
Guest OS 105-N
VM 110-N
Virtualization Software 104
Host Server 102-1
Host Server 102-2
Host Server 102-N
Network 106
Virtual Desktop Client 122-1
OS 121-1
Client Device 120-1
Virtual Desktop Client 122-2
OS 121-2
Client Device 120-2
Virtual Desktop Client 122-N
OS 121-N
Client Device 120-N

FONT PROCESSING DURING PRINTER REDIRECTION IN VIRTUAL DESKTOP ENVIRONMENTS

CLAIM OF PRIORITY

This application is a continuation of International Application PCT/CN2019/116563, entitled "FONT PROCESSING DURING PRINTER REDIRECTION IN VIRTUAL DESKTOP ENVIRONMENTS", by Hui Yuan et al., with an international filing date of Nov. 8, 2019, which is incorporated by reference herein in its entirety.

TECHNICAL FIELD

The present disclosure generally relates to virtual desktop environments and more specifically to techniques for processing and synchronizing fonts during printer redirection from a virtual desktop to a client device.

BACKGROUND

Desktop virtualization technologies, such as those provided as part of a virtual desktop infrastructure (VDI) or desktop-as-a-service (DAAS) offerings, are becoming more commonplace in today's enterprise work environments. The security of having a remotely stored desktop, ability to access the desktop and applications from any location and on any device, centralized desktop management, efficient use of hardware resources, as well as numerous other benefits made possible by VDI/DAAS are a large benefit for many organizations.

There is a number of implementations of desktop virtualization, some of which offer a full desktop while others provide individual remotely accessible applications. Regardless of the implementation, a common characteristic of these technologies is that the application execution takes place on remote host server usually located in a data center, while the user uses a local client device to access the application over a network connection. For example, in a conventional VDI deployment, each user in an enterprise is provisioned a virtual desktop and is allowed to access his or her virtual desktop over a remote network connection, such as a WAN connection. The virtual desktops are typically hosted on servers that physically reside in a data center of the enterprise or a third-party service provider and each host server may execute multiple virtual desktops. Users can utilize a client device to remotely log into their individual virtual desktop and the client device communicates with the desktop over the network using a remote display protocol, such as remote desktop protocol (RDP), PC-over-IP protocol (PCoIP), VMware Blast, virtual network computing (VNC) protocol, or the like. Using the remote desktop protocol, the user can interact with applications of the virtual desktop which are running on the remote host server in such a way that only the display, keyboard, and mouse information is communicated with the local client device. A common implementation of this approach is to host multiple desktop operating system instances on separate virtual machines deployed on a server hardware platform running a hypervisor.

Due to the nature of remote execution in the context of virtual desktop sessions, some of the conventional desktop functionality may not operate as intended on virtual desktops under certain circumstances. For example, printing various documents may present problems and inefficiencies due to the differences in physical location between the user's client device and the host server hosting the virtual desktop. Moreover, specific font information used in the documents may also present issues when printing in this context, potentially leading to printing errors, messy appearance, or missing information in printed documents.

DETAILED DESCRIPTION

Figure 1:
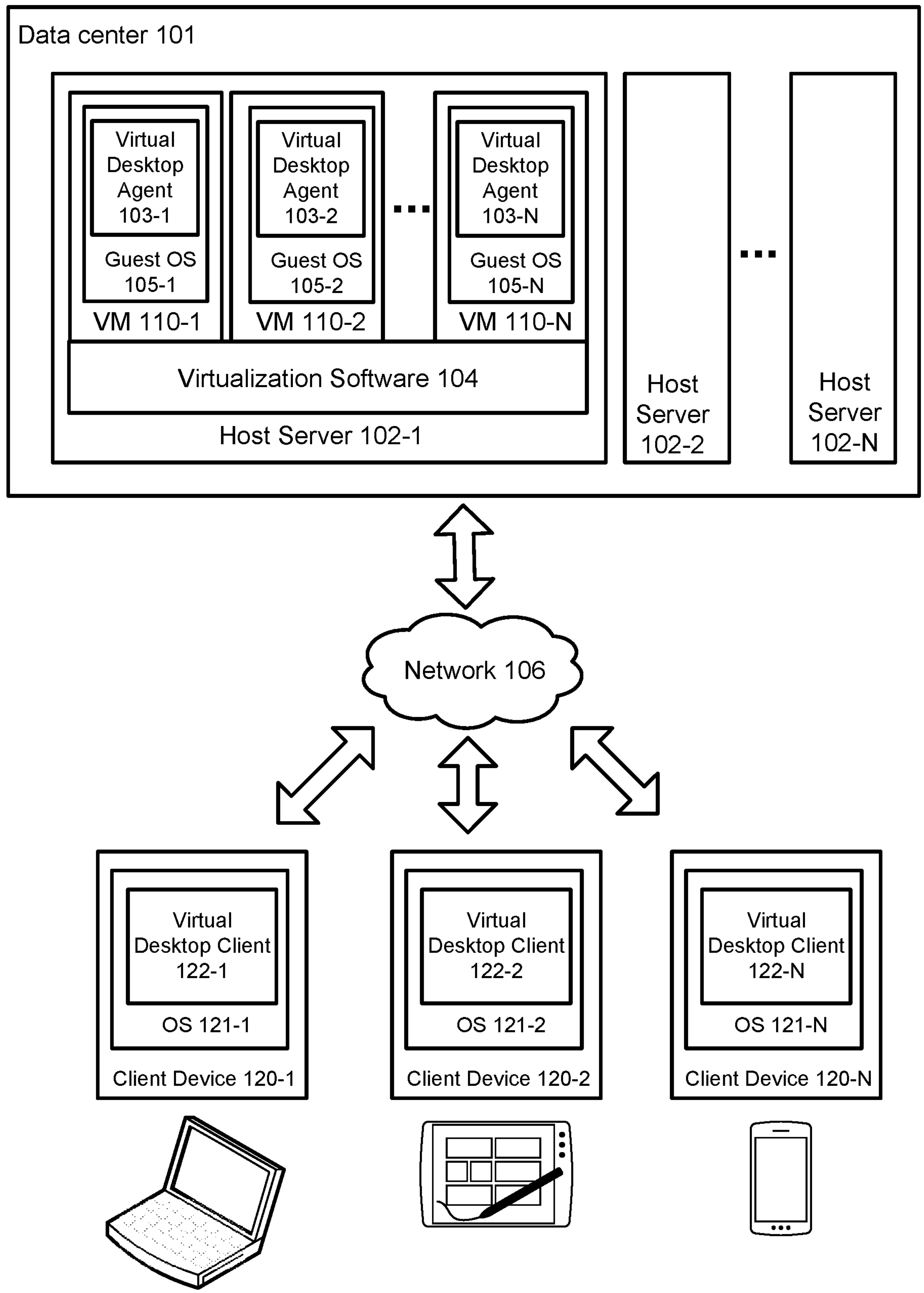
FIG. 1 illustrates an example of a virtual desktop environment, in accordance with various embodiments.

Systems and methods in accordance with various embodiments described herein overcome at least some of the deficiencies described above by enabling printer redirection in a virtual desktop environment that provides a font processing system including a session-based font cache subsystem. The system resolves any font mismatching issues that might arise in the context of printing on a virtual desktop from various client devices in an optimized manner that reduces latency and generally improves performance during printer redirection. The session-based font cache is used to accelerate the font processing and to reduce the transmitted font data between the virtual desktop agent and the virtual desktop client in the context printer redirection.

In various embodiments, a virtual desktop session is first established between a virtual desktop client operating on a client computing device and a virtual desktop agent operating on a host server. The virtual desktop client is responsible for displaying the desktop user interface (UI) information (i.e. framebuffer pixel data) received from the virtual desktop agent, as well as for capturing local user inputs such as keyboard and mouse events and transmitting them to the virtual desktop agent. Conversely, the virtual desktop agent is responsible for providing the user input to the guest operating system of the virtual desktop on the host server and is also responsible transmitting the UI information stored in the framebuffer of the host server over the network to the virtual desktop client. At the time of establishing the virtual desktop session, the virtual desktop client sends information regarding the local printers installed on the client computing device, as well as font information of the client device OS to the virtual desktop agent. At this point, the virtual desktop agent determines a mismatched font set between the client and the virtual desktop by comparing the font information at the operating system (OS) of the client computing device received from the virtual desktop client against the font information on the virtual desktop OS. The virtual desktop agent also installs a set of virtual printers (also referred to as redirected printers) on the virtual desktop which correspond to the physical printers installed on the client computing device.

During the virtual desktop session, a print request may be detected by the virtual desktop agent. For example, an application executing on the virtual desktop may issue a print request (based on received user input) to print a document that is opened for editing in the application. In response to the print request, the virtual desktop agent operating on the host server identifies a set of font data used in the document requested to be printed. In one embodiment, this can be determined by reading the spool file (SPL) that is generated by the operating system of the virtual desktop when the user submits the print request. The spool file contains the digital document contents that are sent to the printer for printing.

Once the font data used in the document is identified, the virtual desktop agent determines whether any portion of the set of font data used in the document is part of the mismatched font set previously computed. If any of the font data used in the document is part of the mismatched font set, the virtual desktop agent attaches a package containing at least a portion of the font data to the print data obtained by processing the document and redirects the print request including the package and the print data to the virtual desktop client. The virtual desktop client then causes the document to be printed on a local printer installed on the client computing device (corresponding to the virtual printer installed on the virtual desktop) by using the package containing at least the portion of the set of font data and the print data received from the virtual desktop agent.

In addition to identifying whether the font data is part of the mismatched set, the virtual desktop agent also identifies whether the font data is cached by the font cache subsystem on the virtual desktop client. In one embodiment, this is performed by first creating a hash table of keys and values, where each key indicates the name of the font and the values indicate the set of characters used in the document to be printed. For each data pair in the hash table that is also part of the mismatched font set, the virtual desktop agent then checks whether the font name is in a session-based font cache established on the client computing device by the virtual desktop client. If the font name is not in the session-based font cache, the virtual desktop agent creates an initial subset font package containing the characters used in the document and attaches the initial subset font package to the document transmitted from the virtual desktop agent to the virtual desktop client. If the font is already stored in the session-based font cache on the client computing device, the virtual desktop agent generates a delta font package containing the characters in the document that can be merged with the subset font package cached on the client computing device and attaches the delta font package to the document transmitted to the virtual desktop client.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the virtual desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms “desktop”, “remote desktop”, and “virtual desktop” refer to a computing environment in which a user can launch, interact with, and manage the user’s applications, settings, and data. Each client device (120-1, 120-2, 120-N) can allow a user to view on a desktop graphical user interface (on a local client device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each VM hosting a desktop for each individual user. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application (“native client”), or a web browser (“web client”). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In one embodiment, the interaction is performed by the virtual desktop agent transmitting encoded visual display information (e.g., framebuffer pixel data) over the network to the virtual desktop client and the virtual desktop client in turn transmitting user input events (e.g. keyboard, mouse, touch input events) to the remote desktop agent. Interactions between the virtual desktop client (e.g., 122-1, 122-2, 122-N) and the virtual desktop agent (e.g. 103-1, 103-2, 103-N), including transmission of encoded visual display information from the agent to the client and user input events from the client to the agent can be performed using a remote desktop protocol, such as Remote Desktop Protocol (RDP), PC-over-IP protocol (PCoIP), VMware Blast protocol, virtual network computing (VNC) protocol, or the like.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment might include many more host servers, which may be distributed over multiple data centers, which can include many other types of devices, such as switches, power supplies, cooling systems, environmental controls, and the like, which are not illustrated herein. Similarly, a single host server would typically host many more virtual machines than the number shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
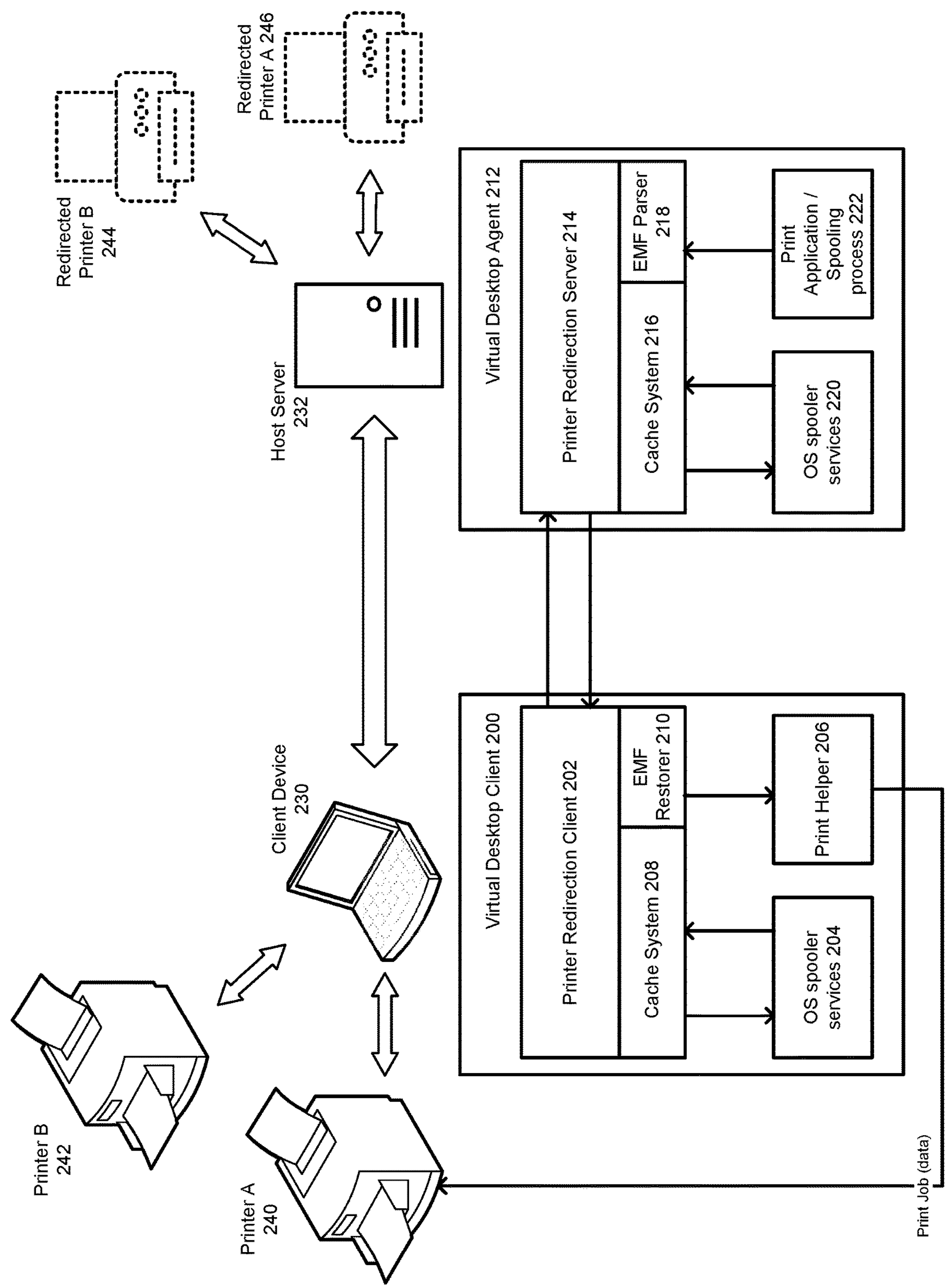
FIG. 2 is an illustration of a system in which printer redirection with font processing is implemented in accordance with various embodiments.

FIG. 2 is an illustration of a system in which printer redirection with font processing is implemented in accordance with various embodiments. As shown in the illustration, the virtual desktop client 200 includes a printer redirection client 202 and the virtual desktop agent 212 includes the printer redirection server 214. At the time of establishing the virtual desktop session, the printer redirection client 202 transmits to the printer redirection server 214 a set of information, including information about any local physical printers (printer A 240 and printer B 242) installed on the client computing device 230. The local connected/installed printer information can be obtained by the printer redirection client 202 by using API provided by OS spooler services 204. In addition, the printer redirection client 202 sends information about the fonts available on the operating system of the client computing device 230 to the printer redirection server 214. In one embodiment, the printer redirection client 202 obtains the available font information by making one or more Application Programming Interface (API) calls to the operating system on the client computing device.

In response to receiving the information from the client, the printer redirection server 214 installs redirected printer A 246 and redirected printer B 244 on the virtual desktop corresponding to the physical printer A 240 and physical printer B 242. This can be done by communicating with the OS spooler services 220 on the host server. In addition, the redirected printer computes a mismatched font set between the operating system of the client computing device 230 and the guest operating system of the virtual desktop hosted on the host server 232. The printer redirection server 214 can also obtain the set of available fonts from the OS by making API calls to the operating system of the host server 232 and compare them to the font information received from the client. In one embodiment, the mismatched font set can be computed as $F_{diff}=F_{agent}-F_{client}$ where $F_{agent}$ represents the set of fonts available on the guest OS on the virtual machine on which the virtual desktop agent 212 operates and the set $F_{client}$ represents the set of fonts available on the operating system of the client computing device 230 on which the virtual desktop client 200 is operating on. The mismatched set of fonts $F_{diff}$ can thus be considered to be that font data which is natively available on the virtual desktop OS but not natively available on the client computing device's OS. This $F_{diff}$ can be stored by the printer redirection server 214 to be used later for processing print redirection requests.

During the virtual desktop session, the user may issue a print request when using an application 222 being executed on the virtual desktop. For example, the user may provide input to (over the network) to print a document when accessing a version of Microsoft Word executing on the desktop running on the virtual machine hosted on the host server 232. In response to the user's input, the print application 222 initiates a spooling process which provides the spool data (e.g. SPL/EMF data containing the digital contents of the document) to the EMF parser 218 of the printer redirection server 214. Enhanced MetaFile (EMF) is a commonly used spool file format used in printing by the Windows operating system. An EMF metafile is a series of variable-length records. Referred to as EMF records, these are objects that represent each element in the document and contain graphics drawing commands, object definitions and properties. Different records have different attributes, the values of which are defined by the data within the EMF file. Communication between the print application 222 and the EMF parser 218 can be implemented over Remote Procedure Call (RPC).

In the illustrated embodiment, the EMF parser 218 performs deduplication and compression of the EMF data for transmission to the printer redirection client 202. In addition, the EMF parser 218 processes the EMF data to determine the set of font information used in the document requested to be printed. An example of a process used for processing the set of font information used in the document will be described in further detail below, with reference to FIG. 4A. A hash table comprised of keys and values (e.g. <key, value>) is used to store the font information used in the document, wherein the key indicates the font name and the value is the set of characters used in the document requested to be printed.

Once the hash table has been created, each pair of data in the hash table is checked in order to determine whether the key indicating the font name is part of the mismatched font set ($F_{diff}$). If the key is part of the mismatched set, the printer redirection server 214 checks whether the font name corresponding to the key is stored in the session-based font cache system 208 at the printer redirection client 202. If the font name is not found in the session-based font cache system 208, the printer redirection server 214 creates an initial subset font package containing the characters used in the document and attaches the initial subset font package to the print data (e.g. processed EMF/SPL data generated at the virtual desktop agent 212) which is transmitted from the printer redirection server 214 to the printer redirection client 202. In one embodiment, this can be performed using the CreateFontPackage function. The CreateFontPackage function creates a subset version of a specified font that can be installed on the client computing device 230, such that if any pages later in the document may need characters or glyphs that were not used on the first page, the printer redirection server 214 can subsequently create "delta" font packages that can be merged with the original subset font package in order to extend it with the additional characters. Therefore, if the printer redirection client determines that the font name is already stored in the session-based font cache system 208, then the printer redirection server 214 creates a delta font package containing the characters in the document that can be merged with the initial subset font package already cached on the client computing device 230 and attaches the delta font package to the print data transmitted from the virtual desktop agent to the printer redirection client 202.

Once all of the initial subset font packages and delta font packages have been created, the printer redirection server 214 places the font data at the front of the print data and transmits all of the information to the printer redirection client 202. The EMF restorer 210 at the printer redirection client 202 receives all of the EMF data, restores the deduplicated data and performs the decompression process on the received data. In addition, the EMF restorer 210 also parses the font data from the received data and inserts the font data (subset font packages and delta font packages) into the session-based font cache system 208. In one embodiment, the received font data is installed on the client computing device as a process-based font, meaning that the installed font is only visible for the install process and have no effect on the system on the client computing device 230 outside of the virtual desktop client 200 processes. In one embodiment, once the fonts have been installed, the printer redirection client 202 also transmits the names of the fonts that were cached back to the printer redirection server 214 so that the session-based cache system 216 on the server can be updated.

Once the fonts have been installed on the session-based font cache 208, the print request is redirected to the print helper 206 which routes the print request including all of the necessary information to print the document to printer A 240.

Figure 3:
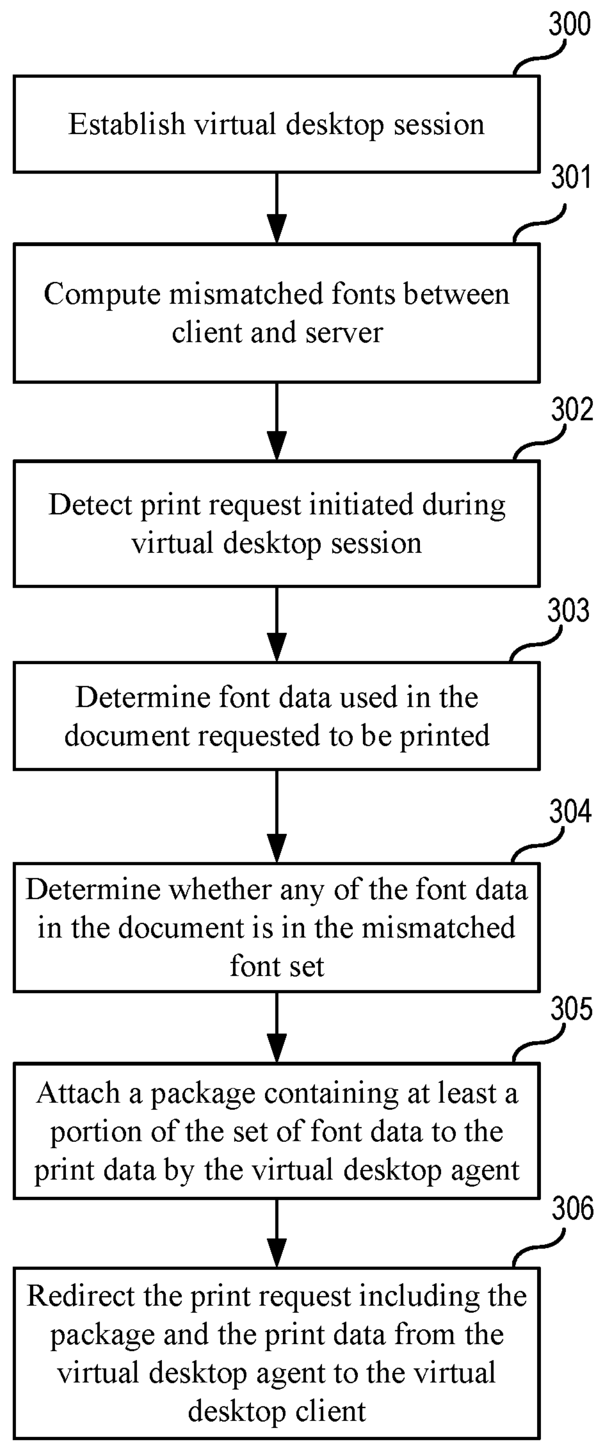
FIG. 3 illustrates an example of a process for font processing during print redirection, in accordance with various embodiments.

FIG. 3 illustrates an example of a process for font processing during print redirection, in accordance with various embodiments. As shown in operation 300, a virtual desktop session is first established between a virtual desktop client and a virtual desktop agent. In operation 301, the virtual desktop agent computes a mismatched font set between the set of fonts available on the client computing device and the set of fonts available on the virtual desktop. In operation 302, during the virtual desktop session, a print request is detected by the virtual desktop agent. In operation 303, the virtual desktop agent determines the set of font data used in the document requested to be printed. In operation 304, the virtual desktop agent determines whether any of the font data used in the document is part of the mismatched font set. In operation 305, if at least some of the font data used in the document is part of the mismatched font set, the virtual desktop attaches a package containing at least a portion of the font data to the print data obtained by processing the document. In operation 306, the virtual desktop agent redirects the print request, including the print data and the attached package to the virtual desktop client.

Figure 4A:
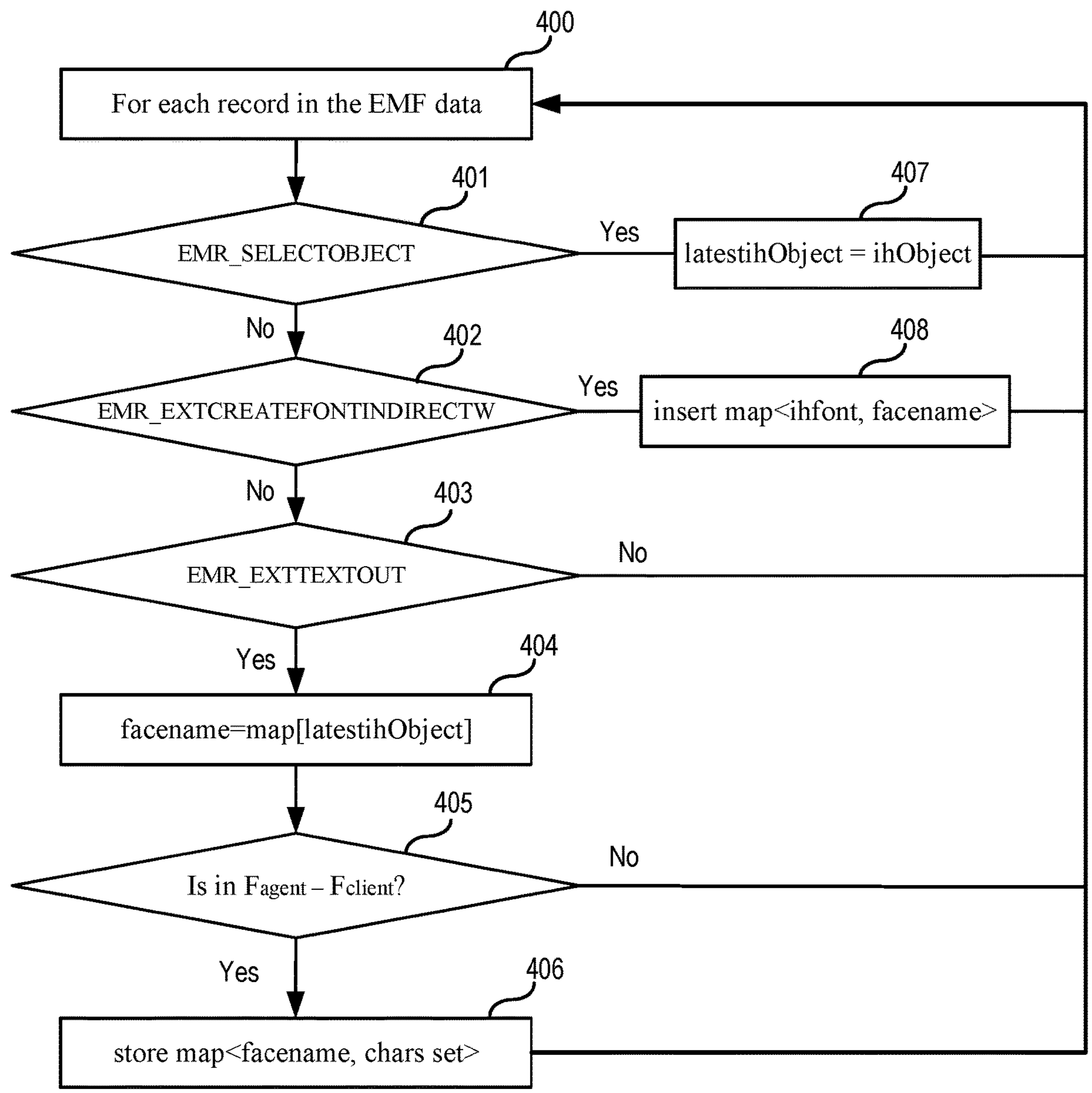
FIG. 4A is an example of processing the EMF data in order to determine the font information used in the document, in accordance with various embodiments.

FIG. 4A is an example of processing the EMF data in order to determine the font information used in the document, in accordance with various embodiments. The input to the process illustrated in FIG. 4A is the EMF content of the document to be printed and the output of the process is a hash map of keys and values, wherein each key indicates a font name and the values indicate the set of characters in the document of that font name.

As previously described, EMF files are intended to be portable between applications, with the EMF structure specifying a metafile format that can store a picture in device-independent form. The stored picture can be rendered by parsing and processing the metafile. An EMF metafile is a series of variable-length records. Called EMF records, these are objects that represent each element in the document and contain graphics drawing commands, object definitions and properties. Different records have different attributes, the values of which are defined by the data within the EMF file.

As shown in operation 400, each record in the EMF data is processed by the print redirection server. In operation 401, for each EMF record, the EMR_SELECTOBJECT function is first called. The EMR_SELECTOBJECT function selects a graphics object into the device context (DC). If the operation 401 is successful indicating that a graphics object has been selected, then operation 407 is called, where the latestihObject is set to the current ihObject. The ihObject is the index of a graphics object (font object) in EMF object table. If the operation 401 is not successful, the process flows to operation 402, where the function EMR_EXTCREATEFONTINDIRECTW is called, which defines a logical font for graphics operations. The logical font object can be selected into by an EMR_SELECTOBJECT record.

If operation 402 is successful, the process flows to operation 408, where a function is called to insert into the font name into the hash map. The attribute facename denotes the font name. The attribute ihFont, an unsigned integer that specifies the index of the logical font object in the EMF object table. The process then proceeds back to operation 400 to process the next EMF record in the EMF data. If operation 402 is not successful, the process flows to operation 403, where the function EMR_EXTTEXTOUT is called. The function EMR_EXTTEXTOUT draws a text string using the current font (latest selected into DC).

If operation 403 is not successful, the process flows back to operation 400 to process the next EMF record. If operation 403 is successful, the process flows next to operation 404, where the name of the font in the map is set to the latestihObject. The process then flows to operation 405, where it is determined whether the font is part of the mismatched font set ($F_{agent}-F_{client}$). If the operation 405 is not successful (meaning that the font is not part of the mismatched font set), the process flows back to operation 400 to process the next EMF record if any. If the operation 405 is successful (meaning that the font is part of the mismatched font set), the process flows to operation 406, where the font name and character set is stored into the hash map.

As mentioned above, once the process illustrated in FIG. 4A is complete, a hash map is produced which contains all of the font information used in the document that is part of the mismatched font set.

Figure 4B:
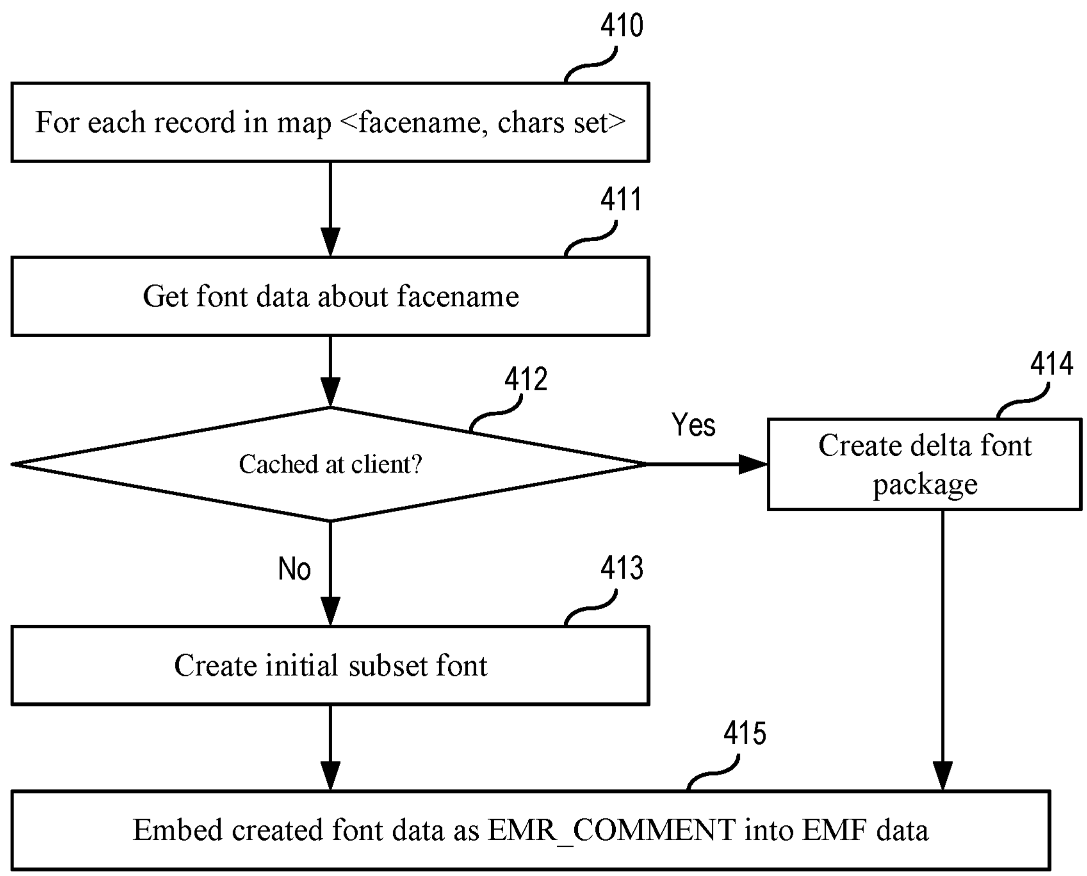
FIG. 4B illustrates an example of processing the hash map to produce the necessary font package which will be attached to the document during the print redirection to the virtual desktop client, in accordance with various embodiments.

FIG. 4B illustrates an example of processing the hash map to produce the necessary font package which will be attached to the document during the print redirection to the virtual desktop client, in accordance with various embodiments.

As shown in operation 410, the process is performed for each record in the hash map of keys and values. In operation 411, the virtual desktop agent gets the font data about the facename (name of the font). Then in operation 412, the virtual desktop agent (e.g. the print redirection server) determines whether the font is already cached at the client—i.e. the font information is already stored in the session-based font cache at the virtual desktop client. If the operation 412 is not successful (the font is not cached at the client), then the process flows to operation 413, where the virtual desktop agent creates an initial subset font package that can be installed on the client computing device. The process then flows to operation 415, where the virtual desktop embeds the created font data (initial subset font package) as an EMR_COMMENT into the EMF data which is transmitted to the virtual desktop client.

If the operation 412 is successful (the font is already cached at the client), the process flows to operation 414, where the virtual desktop client creates only a delta font package. The process then flows to operation 415, where the virtual desktop embeds the created font data (delta font package) as an EMR_COMMENT into the EMF data which is transmitted to the virtual desktop client.

It should be noted that although FIG. 4A and FIG. 4B refer to certain names or identifiers of various functions, API calls, and/or protocols, within the context of a particular operating system (e.g. Windows OS), these names are being provided purely as an example of just one possible implementation of the processes described throughout this disclosure. It will be evident to a person of ordinary skill in the art that numerous alternative implementations are possible within the scope of the various embodiments described herein.

Figure 5:
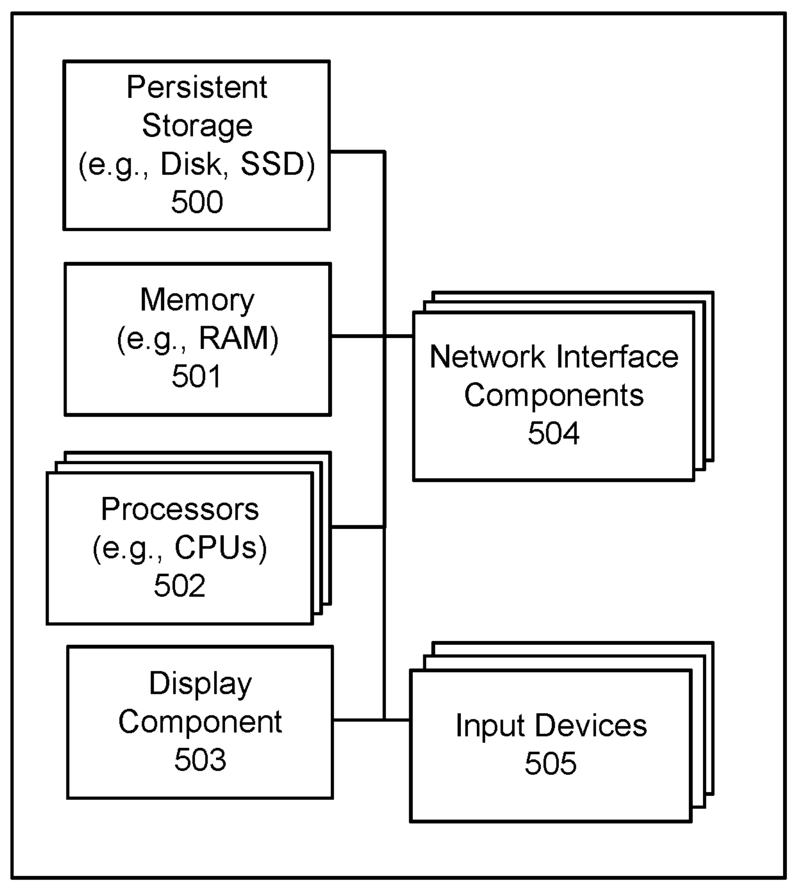
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random-access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for font processing during printing redirection in a virtual desktop environment, the method comprising:

establishing, over a network connection, a virtual desktop session between a virtual desktop client operating on a client computing device and a virtual desktop agent operating on a host server;

computing a mismatched font set between fonts available on the client computing device and fonts available on the host server;

detecting a print request of a document initiated in the virtual desktop session on the host server;

determining a set of font data used in the document requested to be printed, wherein determining the set of font data used in the document requested to be printed further comprises processing a spool file of the print request to produce a table of key value pairs, wherein each key indicates a font name and each value indicates a set of characters of the corresponding font used in the document;

determining whether at least a portion of the set of font data used in the document is part of the mismatched font set;

in response to determining that the set of font data used in the document is part of the mismatched font set, attaching a package containing at least a portion of the set of font data to the print data processed from the document by the virtual desktop agent; and redirecting the print request including the package and the print data to the virtual desktop client, wherein the document is printed on a local printer installed on the client computing device using the package containing at least the portion of the set of font data.

2. The method of claim 1, further comprising:

establishing by the virtual desktop client, a first session-based font cache on the client computing device; and establishing by the virtual desktop agent, a second session-based font cache on the host server.

3. The method of claim 1, further comprising:

for each key value pair in the table:

determining whether the font indicated by the key is part of the mismatched font set; and if the font indicated by the key is part of the mismatched font set, determining whether the font is stored in a session-based font cache established on the client computing device by the virtual desktop client; and if the font is not stored in the session-based font cache on the client computing device, creating an initial subset font package containing the characters used in the document and attaching the initial subset font package to the document transmitted from the virtual desktop agent to the virtual desktop client;

otherwise if the font is stored in the session-based font cache, generating a delta font package containing the characters in the document that can be merged with the subset font package cached on the client computing device and attaching the delta font package to the document transmitted from the virtual desktop agent to the virtual desktop client.

4. The method of claim 3, further comprising:

parsing the package containing at least the portion of the set of font data received by the virtual desktop client and adding the initial subset font package or the delta font package to the session-based cache on the client computing device; and transmitting font name information added to the session-based cache from the virtual desktop client to the virtual desktop agent over the network.

5. The method of claim 4, wherein the set of font data added to the session-based cache is visible only within the virtual desktop client and is not visible to other processes executing on the client computing device.

6. The method of claim 1, wherein establishing the virtual desktop session further comprises:

receiving, from the virtual desktop client to the virtual desktop agent, information identifying one or more local printers installed on the client computing device; and installing, by the virtual desktop agent, one or more virtual printers corresponding to the one or more local printers installed on the client computing device, wherein the one or more virtual printers are used to redirect print requests from the virtual desktop agent to the virtual desktop client.

7. A computing system, comprising:

at least one processor; and memory including instructions that, when executed by the at least one processor, cause the computing system to perform the steps of:

establishing, over a network connection, a virtual desktop session between a virtual desktop client operating on a client computing device and a virtual desktop agent operating on a host server;

computing a mismatched font set between fonts available on the client computing device and fonts available on the host server;

detecting a print request of a document initiated in the virtual desktop session on the host server;

determining a set of font data used in the document requested to be printed, wherein determining the set of font data used in the document requested to be printed further comprises processing a spool file of the print request to produce a table of key value pairs, wherein each key indicates a font name and each value indicates a set of characters of the corresponding font used in the document;

determining whether at least a portion of the set of font data used in the document is part of the mismatched font set;

in response to determining that the set of font data used in the document is part of the mismatched font set, attaching a package containing at least a portion of the set of font data to the print data processed from the document by the virtual desktop agent; and redirecting the print request including the package and the print data to the virtual desktop client, wherein the document is printed on a local printer installed on the client computing device using the package containing at least the portion of the set of font data.

8. The computing system of claim 7, the memory further including instructions that, when executed by the at least one processor, cause the computing system to perform the steps of:

establishing by the virtual desktop client, a first session-based font cache on the client computing device; and establishing by the virtual desktop agent, a second session-based font cache on the host server.

9. The computing system of claim 7, the memory further including instructions that, when executed by the at least one processor, cause the computing system to perform the steps of:

for each key value pair in the table:

determining whether the font indicated by the key is part of the mismatched font set; and if the font indicated by the key is part of the mismatched font set, determining whether the font is stored in a session-based font cache established on the client computing device by the virtual desktop client; and if the font is not stored in the session-based font cache on the client computing device, creating an initial subset font package containing the characters used in the document and attaching the initial subset font package to the document transmitted from the virtual desktop agent to the virtual desktop client;

otherwise if the font is stored in the session-based font cache, generating a delta font package containing the characters in the document that can be merged with the subset font package cached on the client computing device and attaching the delta font package to the document transmitted from the virtual desktop agent to the virtual desktop client.

10. The computing system of claim 9, the memory further including instructions that, when executed by the at least one processor, cause the computing system to perform the steps of:

parsing the package containing at least the portion of the set of font data received by the virtual desktop client and adding the initial subset font package or the delta font package to the session-based cache on the client computing device; and transmitting font name information added to the session-based cache from the virtual desktop client to the virtual desktop agent over the network.

11. The computing system of claim 10, wherein the set of font data added to the session-based cache is visible only within the virtual desktop client and is not visible to other processes executing on the client computing device.

12. The computing system of claim 7, wherein establishing the virtual desktop session further comprises:

receiving, from the virtual desktop client to the virtual desktop agent, information identifying one or more local printers installed on the client computing device; and installing, by the virtual desktop agent, one or more virtual printers corresponding to the one or more local printers installed on the client computing device, wherein the one or more virtual printers are used to redirect print requests from the virtual desktop agent to the virtual desktop client.

13. A non-transitory computer readable storage medium comprising one or more sequences of instructions, the instructions when executed by one or more processors causing the one or more processors to execute the operations of:

establishing, over a network connection, a virtual desktop session between a virtual desktop client operating on a client computing device and a virtual desktop agent operating on a host server;

computing a mismatched font set between fonts available on the client computing device and fonts available on the host server;

detecting a print request of a document initiated in the virtual desktop session on the host server;

determining a set of font data used in the document requested to be printed, wherein determining the set of font data used in the document requested to be printed further comprises processing a spool file of the print request to produce a table of key value pairs, wherein each key indicates a font name and each value indicates a set of characters of the corresponding font used in the document;

determining whether at least a portion of the set of font data used in the document is part of the mismatched font set;

in response to determining that the set of font data used in the document is part of the mismatched font set, attaching a package containing at least a portion of the set of font data to the print data processed from the document by the virtual desktop agent; and redirecting the print request including the package and the print data to the virtual desktop client, wherein the document is printed on a local printer installed on the client computing device using the package containing at least the portion of the set of font data.

14. The non-transitory computer readable storage medium of claim 13, further comprising instructions executed by the one or more processors causing the one or more processors to execute the operations of:

establishing by the virtual desktop client, a first session-based font cache on the client computing device; and establishing by the virtual desktop agent, a second session-based font cache on the host server.

15. The non-transitory computer readable storage medium of claim 13, further comprising instructions executed by the one or more processors causing the one or more processors to execute the operations of:

for each key value pair in the table:

determining whether the font indicated by the key is part of the mismatched font set; and if the font indicated by the key is part of the mismatched font set, determining whether the font is stored in a session-based font cache established on the client computing device by the virtual desktop client; and if the font is not stored in the session-based font cache on the client computing device, creating an initial subset font package containing the characters used in the document and attaching the initial subset font package to the document transmitted from the virtual desktop agent to the virtual desktop client;

otherwise if the font is stored in the session-based font cache, generating a delta font package containing the characters in the document that can be merged with the subset font package cached on the client computing device and attaching the delta font package to the document transmitted from the virtual desktop agent to the virtual desktop client.

16. The non-transitory computer readable storage medium of claim 15, further comprising instructions executed by the one or more processors causing the one or more processors to execute the operations of:

parsing the package containing at least the portion of the set of font data received by the virtual desktop client and adding the initial subset font package or the delta font package to the session-based cache on the client computing device; and transmitting font name information added to the session-based cache from the virtual desktop client to the virtual desktop agent over the network.

17. The non-transitory computer readable storage medium of claim 13, wherein establishing the virtual desktop session further comprises:

receiving, from the virtual desktop client to the virtual desktop agent, information identifying one or more local printers installed on the client computing device; and installing, by the virtual desktop agent, one or more virtual printers corresponding to the one or more local printers installed on the client computing device, wherein the one or more virtual printers are used to redirect print requests from the virtual desktop agent to the virtual desktop client.

* * * * *